United States Patent
Achiwa (10) Patent No.: US 8,842,325 B2
(45) Date of Patent: Sep. 23, 2014

(54) IMAGE PROCESSING APPARATUS, CONTROL METHOD THEREOF, AND STORAGE MEDIUM

(71) Applicant: Canon Kabushiki Kaisha, Tokyo (JP)

(72) Inventor: Ken Achiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/017,968

(22) Filed: Sep. 4, 2013

(65) Prior Publication Data

US 2014/0071463 A1    Mar. 13, 2014

(30) Foreign Application Priority Data

Sep. 7, 2012  (JP) .................................. 2012-197899

(51) Int. Cl.
*G06F 15/00*    (2006.01)

(52) U.S. Cl.
USPC ....................................................... 358/1.16

(58) Field of Classification Search
USPC ............................................... 358/1.15–1.16
See application file for complete search history.

(56) References Cited

U.S. PATENT DOCUMENTS

| 7,599,087 | B2 * | 10/2009 | Fukuda et al. ............... 358/1.16 |
| 8,472,042 | B2 | 6/2013 | Tokumoto |
| 2011/0058191 | A1 | 3/2011 | Tokumoto |

FOREIGN PATENT DOCUMENTS

JP    2011-61555 (A)    3/2011

* cited by examiner

*Primary Examiner* — Saeid Ebrahimi Dehkordy (74) *Attorney, Agent, or Firm* — Fitzpatrick, Cella, Harper & Scinto

(57) ABSTRACT

To accomplish this, when an image processing apparatus determines with reference to a parameter associated with the image processing apparatus that allocations of storage capacities to a first storage unit which stores block images obtained by dividing image data in a page unit and a second storage unit which stores tile images obtained by dividing each block image are required to be changed, the apparatus changes the allocations of the storage capacities in correspondence with the parameter, and also changes division sizes of the block images and the tile images in accordance with the changes in storage capacities.

10 Claims, 11 Drawing Sheets

| CHANGE UNIT | CHANGE DIRECTION | PRACTICAL EXAMPLE |
|---|---|---|
| FOR RESPECTIVE PRODUCTS | STATIC/FIXED | PRODUCT RANGE<br>(LOW-SPEED DEVICE/HIGH-SPEED DEVICE (SFP/MFP)) |
| FOR RESPECTIVE OPERATION MODES | STATIC/VARIABLE (MANUAL) | USER SETTING<br>(IMAGE QUALITY PRIORITY/PERFORMANCE PRIORITY)<br>(LOSSLESS COMPRESSION/LOSSY COMPRESSION)<br>(EXCLUSIVE OPERATION/SIMULTANEOUS OPERATION)<br>(PROCESSING BIT PRECISION: HIGH ⟵⟶ LOW) |
| FOR RESPECTIVE PROCESSING JOBS | STATIC/VARIABLE (AUTOMATIC) | DATA ATTRIBUTE<br>(COLOR/MONOCHROME)<br>(OUTPUT RESOLUTION: HIGH ⟵⟶ LOW) |

IMAGE PROCESSING APPARATUS, CONTROL METHOD THEREOF, AND STORAGE MEDIUM

BACKGROUND OF THE INVENTION

1. Field of the Invention

The present invention relates to an image processing apparatus, control method thereof, and storage medium.

2. Description of the Related Art

In an image processing apparatus such as an MFP which provides a plurality of functions, that is, copy, scan, print, FAX, and network transmission/reception functions, processing systems of respective functions are unitized by dividing the processing systems by spooling to a storage unit. That is, a copy function is implemented by a combination of scan and print processing systems, a scan transmission function is implemented by a combination of scan and network transmission processing systems, and a PDL print function is implemented by a combination of network reception and print processing systems. In this case, as a processing unit of image data handled by each processing system, a band unit obtained by dividing a page into bands each having a predetermined band height, and a block unit obtained by dividing a page into blocks each having a predetermined block width and height are known in addition to a page unit. Especially, a method of handling image data in block units can reduce a storage capacity required for primary storage in respective processing systems compared to methods of handling image data in page units or band units. Also, the method of handling image data in block units divides a page into square tile units each having an equal block width and height, thus allowing handling of image data without any shape change before and after rotation processing. For example, in Japanese Patent Laid-Open No. 2011-61555, in a PDL print mode, image data after rendering processing is divided into tile units, and encoding parameters are set for respective tile units, thus switching encoding processing.

However, the aforementioned related art suffers the following problem. With the related art, an image processing apparatus cannot provide a function of flexibly changing a print performance and image quality to have scalabilities to the user in the PDL print mode. That is, as needs when the user uses the image processing apparatus, the following cases are assumed wherein the user wants to print at a high speed as much as possible even at a low image quality or he or she wants to print with a high image quality as much as possible even at a low speed. However, these needs cannot be met. That is, since the capacity of a storage area upon storing data divided into tile units is fixed due to unitization, it is difficult to flexibly meet such needs.

SUMMARY OF THE INVENTION

The present invention enables realization of a mechanism for realizing scalabilities of a print speed performance and image quality by suitably changing memory capacities to be allocated to tile divisions.

One aspect of the present invention provides an image processing apparatus comprising: a first division unit configured to divide image data input in a page unit into data in block units; a first storage unit configured to store a plurality of block images divided by the first division unit; a second division unit configured to read out each block image stored in the first storage unit and divide the block image into a plurality of tile images smaller than the block image; a second storage unit configured to store the plurality of tile images divided by the second division unit; a determination unit configured to determine, with reference to a parameter associated with the image processing apparatus, whether or not allocations of storage capacities to the first storage unit and the second storage unit are required to be changed; a capacity control unit configured to change, in a case where the determination unit has determined that the allocations of the storage capacities are required to be changed, the allocations of the storage capacities in correspondence with the parameter; and a division control unit configured to change division sizes in the first division unit and the second division unit in accordance with the storage capacities of the first storage unit and the second storage unit allocated by the capacity control unit.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Processing Apparatus>

Figure 1:
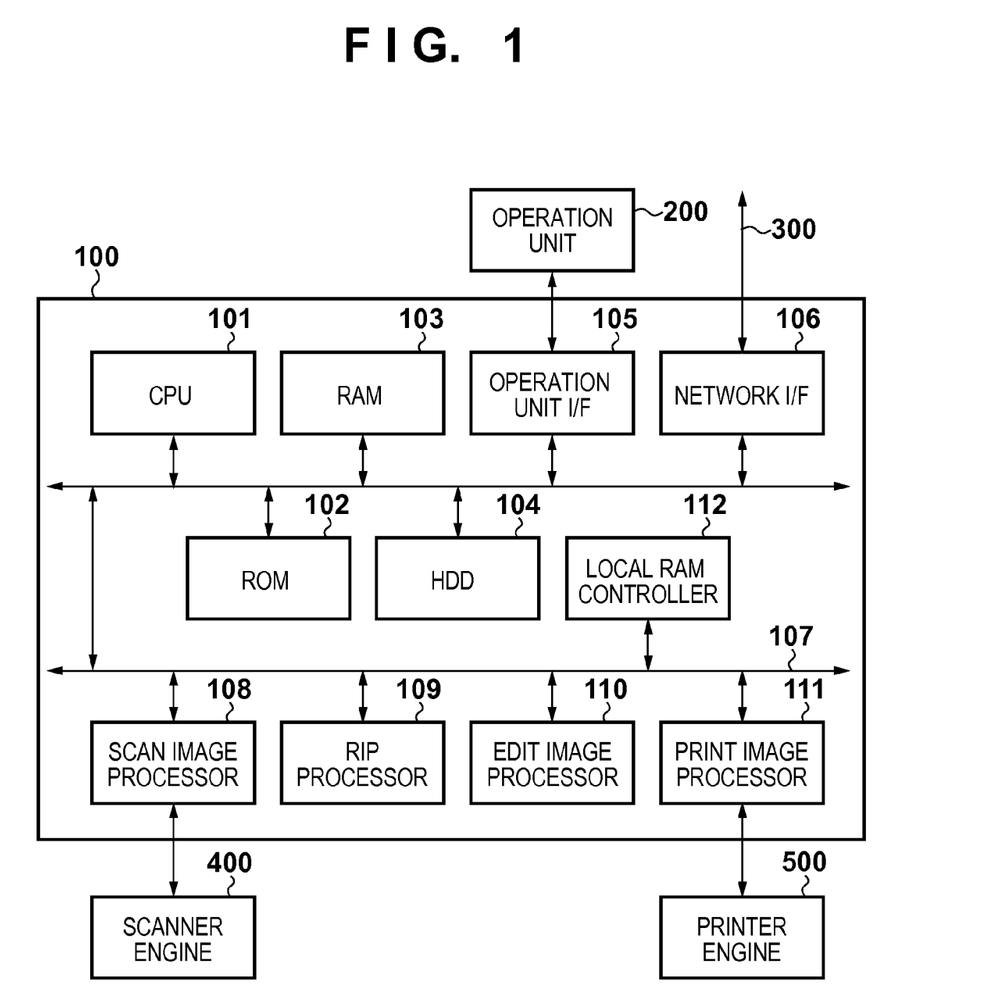
FIG. 1 is a block diagram showing the control arrangement of an image processing apparatus.

The control arrangement of an MFP as an image processing apparatus according to an embodiment of the present invention will be described first with reference to FIG. 1. As shown in FIG. 1, an image processing apparatus includes a controller 100, operation unit 200, network 300, scanner engine 400, and printer engine 500.

The operation unit 200 is a processing unit which acquires a user operation as control information of image processing and displays control information of image processing for the user. The network 300 is a communication unit which is implemented by a LAN, WAN (public line), or the like, and exchanges image data and device information between an external apparatus such as a host computer and server and the image processing apparatus. The scanner engine 400 is an image input device, and is a processing unit which captures image data into the image processing apparatus using an optical sensor and the like. The printer engine 500 is an image output device, and is a processing unit which prints out image data received from the external apparatus or that stored in the image processing apparatus onto a printing medium.

The controller 100 is a control unit which is connected to the operation unit 200, network 300, scanner engine 400, and printer engine 500, and controls the overall image processing apparatus. The controller 100 includes a CPU 101, ROM 102, RAM 103, HDD 104, operation unit I/F 105, network I/F 106, image processors 108 to 111, and local RAM controller 112. The CPU (Central Processing Unit) 101 is a processing unit which systematically controls the overall image processing apparatus. Especially, in PDL print processing, the CPU 101 interprets PDL data received from the external apparatus via the network 300, and converts it into intermediate data called a DL (Display List).

The ROM (nonvolatile memory) 102 is a storage unit which stores a boot program required for the CPU 101 to activate the system. The RAM (volatile memory) 103 is a primary storage unit which is used as a work area required for the CPU 101 to operate on the system, and is also used as a buffer area required to primarily store image data. The HDD 104 is a hard disk drive, and is a large-capacity storage unit required to store various image processing parameters and image data.

The operation unit I/F 105 is an interface unit which acquires a user operation as control information of image processing, and displays control information of image processing for the user. The network I/F 106 is an interface unit, which is implemented by, for example, a LAN card or the like, and is used to exchange image data and device information between the external apparatus such as a host computer and server and the image processing apparatus via the network 300. A system bus 107 is a processing unit which connects the respective processing units included in the controller 100 to exchange image data and control information between the processing units.

The scan image processor 108 is an image processor, which is connected to the scanner engine 400, and applies image processing for correction that matches device characteristics of the scanner engine 400 to image data input from the scanner engine 400. The RIP processor 109 is an image processor, which rasterizes a DL as vector data generated by the CPU 101 based on PDL data into image data as raster data. The edit image processor 110 is an image processor, which applies image processing such as rotation, zooming, movement, and composition to image data generated by the scan image processor 108 or RIP processor 109. The print image processor 111 is an image processor, which is connected to the printer engine 500, applies image processing for correction that matches device characteristics of the printer engine 500, and outputs image data to the printer engine 500. The local RAM controller 112 is a control unit which internally holds local RAMs used as primary storage areas by the image processors such as the scan image processor 108, RIP processor 109, edit image processor 110, and print image processor 111, and controls allocations of storage capacities. Note that the operation of the local RAM controller 112 will be described in detail below with reference to FIG. 2.

<Detailed Arrangement Related to PDL Print Processing>

Figure 2:
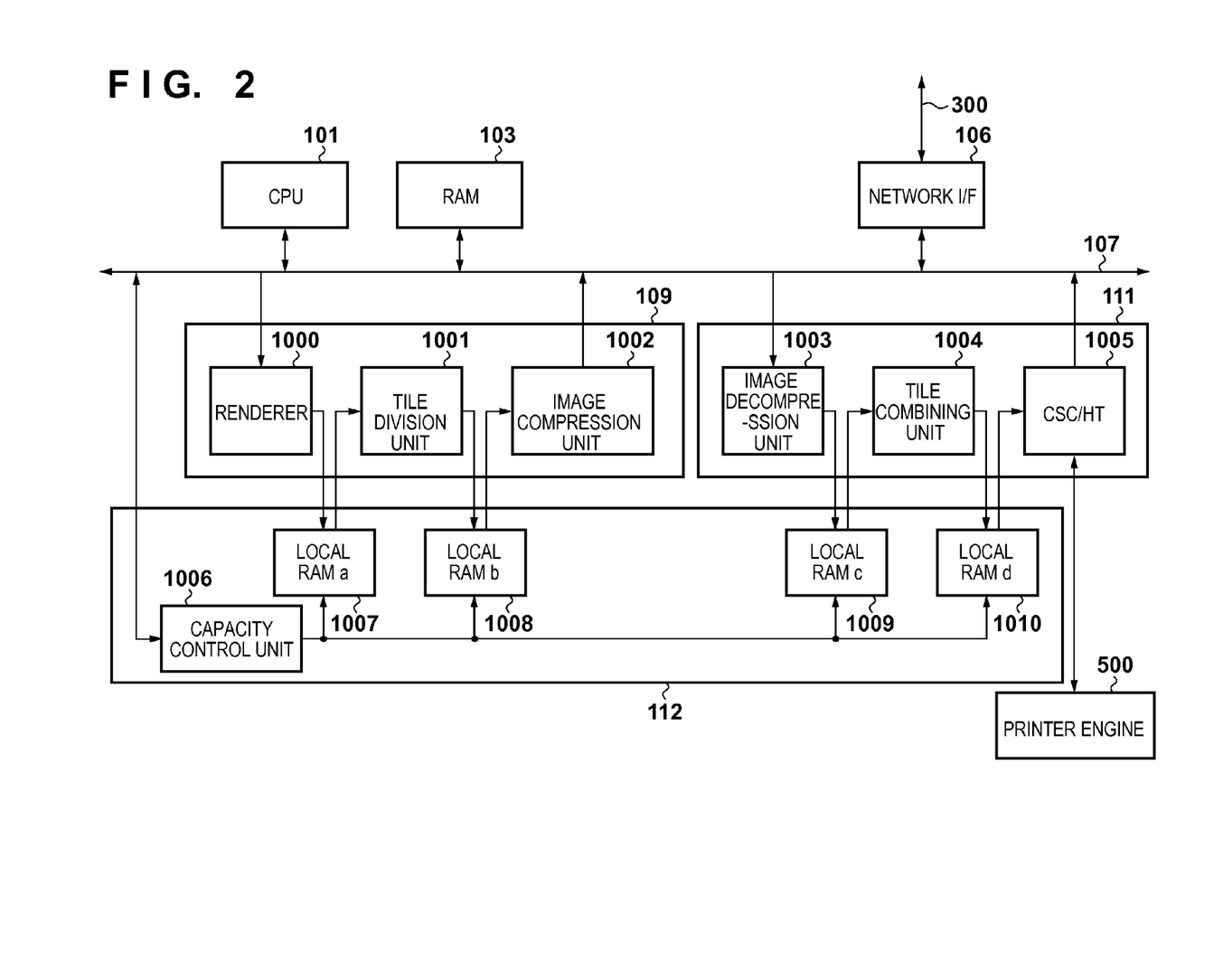
FIG. 2 is a block diagram showing the control arrangement related to PDL print processing.

Details of the processing units related to the PDL print processing of the controller arrangement shown in FIG. 1 will be described below with reference to FIG. 2. As shown in FIG. 2, the RIP processor 109 includes a renderer (first division unit) 1000, tile division unit (second division unit) 1001, and image compression unit 1002. The print image processor 111 includes an image decompression unit 1003, tile combining unit 1004, and CSC (Color Space Conversion)/HT (Halftone processing) 1005. The local RAM controller 112 includes a capacity control unit 1006, and local RAMs 1007 to 1010. The local RAMs 1007 to 1010 are divided as, for example, different storage areas in a single storage device, and their storage capacities can be changed. Therefore, since the total of the storage capacities remains the same, when a storage capacity of a certain local RAM is increased, that of another local RAM has to be decreased. Note that the local RAM a 1007 corresponds to a first storage unit, and the local RAM b 1008 corresponds to a second storage unit.

An overview of PDL print processing will be described below. In PDL print processing, the CPU 101 acquires PDL data transferred from a host computer or server onto the network 300 into the image processing apparatus via the network I/F 106, and stores the PDL data in the RAM 103. Next, the CPU 101 interprets the PDL data stored in the RAM 103 into a DL, and stores this DL in the RAM 103 again.

Next, the CPU 101 activates the RIP processor 109. In response to this activation, the RIP processor 109 executes a series of processes by means of the renderer 1000, tile division unit 1001, and image compression unit 1002 using the DL stored in the RAM 103 as input data, thereby generating tile compressed image data. In this case, the RIP processor 109 stores the obtained tile compressed image data in the RAM 103 again, and notifies the CPU 101 of an end interruption of rendering processing.

Next, the CPU 101 activates the print image processor 111. In response to this activation, the print image processor 111 executes a series of processes by means of the image decompression unit 1003, tile combining unit 1004, and CSC/HT 1005 using the tile compressed image data stored in the RAM 103, thereby generating print image data. In this case, the print image processor 111 transfers the obtained print image data to the printer engine 500, and then notifies the CPU 101 of an end interruption of print image processing.

After that, the printer engine 500 generates a laser driving signal by applying PWM (Pulse Width Modulation) processing to an image signal which represents the print image data, and irradiates the surface of a photosensitive drum with a laser beam based on this laser driving signal, thereby forming an electrostatic latent image on the surface of the photosensitive drum. Furthermore, the printer engine 500 develops this electrostatic latent image using a toner to obtain as a visible image (toner image), and transfers and fixes the toner image on a printing medium. Then, the printer engine 500 discharges the printing medium outside the image processing apparatus.

Operations of the local RAM controller 112 and related image processors in the PDL print processing will be described below. In the PDL print processing, the renderer 1000 in the RIP processor 109 generates a plurality of image data in block units from a page unit using the DL stored in the RAM 103 as input data, and temporarily stores the image data in the local RAM a 1007 in the local RAM controller 112. Subsequently, the tile division unit 1001 generates, using the image data in block units temporarily stored in the local RAM a 1007 as input data, a plurality of image data in tile units obtained by further dividing these image data, and temporarily stores the image data in the local RAM b 1008. Subsequently, the image compression unit 1002 executes compression processing such as JPEG using the image data in tile units temporarily stored in the local RAM b 1008 as input data, and stores obtained tile compressed image data in the RAM 103.

Then, the image decompression unit 1003 in the print image processor 111 executes decompression processing for JPEG or the like using the tile compressed image data stored in the RAM 103 as input data, and temporarily stores obtained tile image data in the local RAM c 1009. Subsequently, the tile combining unit 1004 temporarily stores image data in band units in the local RAM d 1010 using the image data in tile units temporarily stored in the local RAM c 1009 as input data. Subsequently, the CSC/HT 1005 executes color space conversion and halftone processing using the image data in band units temporarily stored in the local RAM d 1010 as input data, and transfers obtained image data to the printer engine 500. Note that the capacity control unit 1006 in the local RAM controller 112 can change storage capacities allocated to the local RAM a 1007 to local RAM d 1010.

<Image Data>

Figure 5:
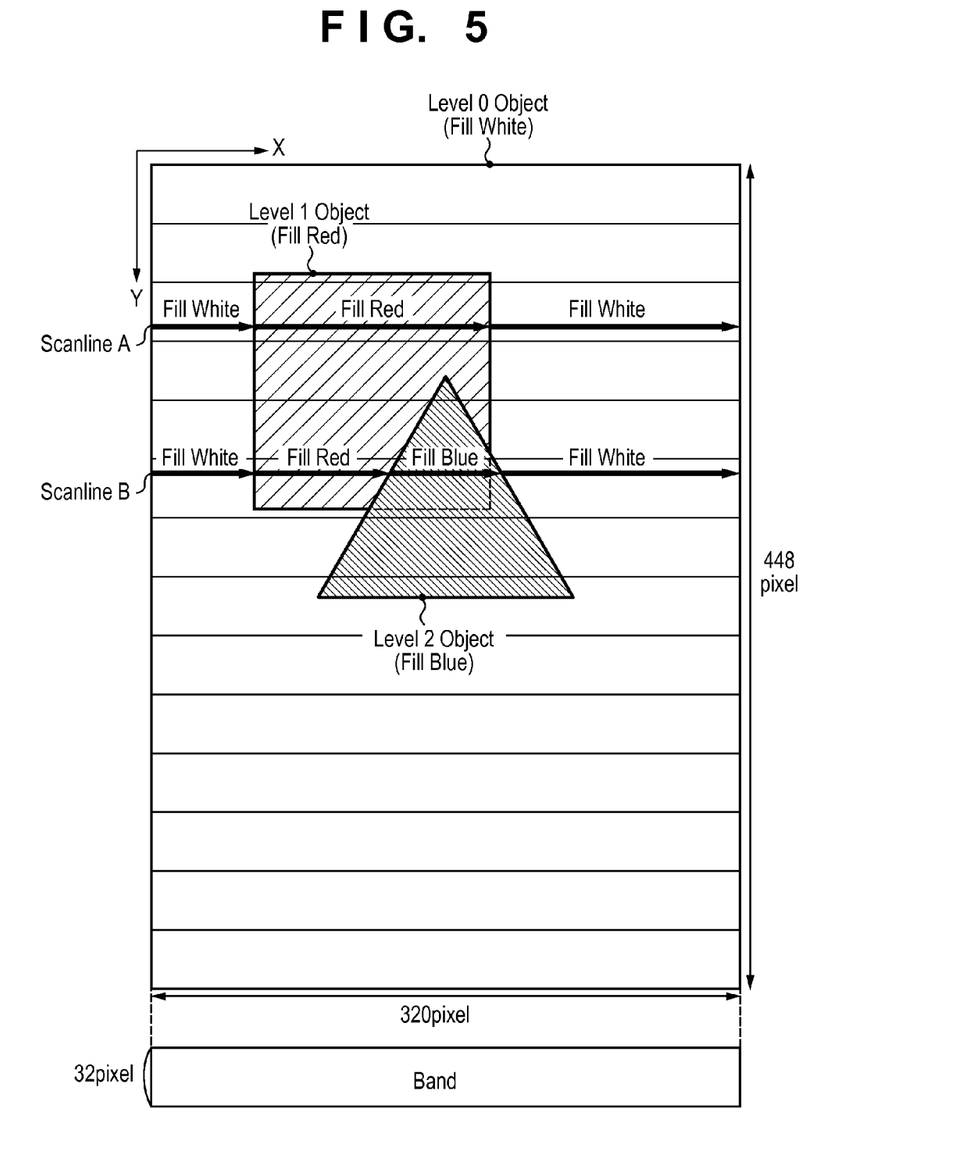
FIG. 5 is a view showing rendering processing executed in band units.
Figure 6:
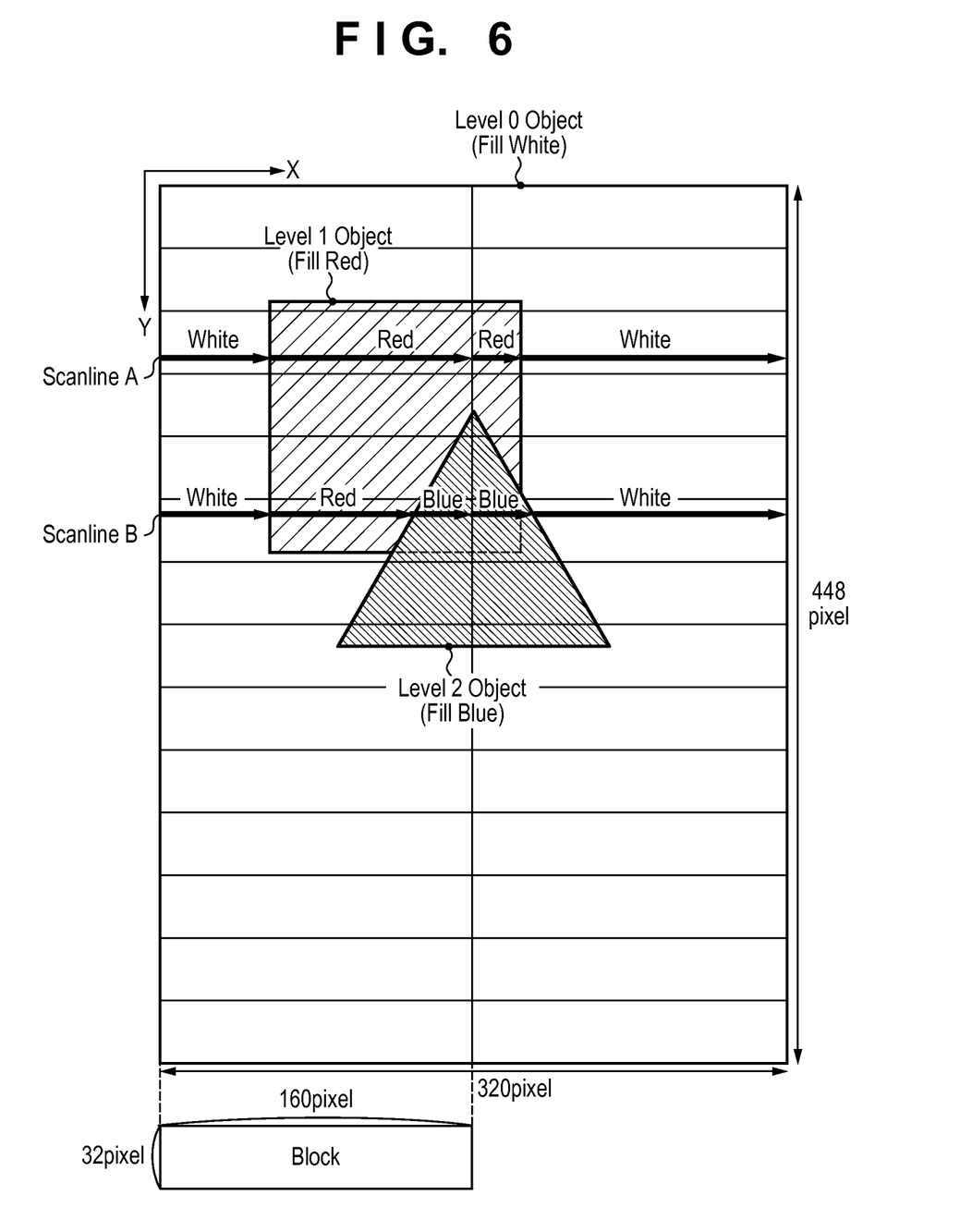
FIG. 6 is a view showing rendering processing executed in block units of a predetermined size.
Figure 7:
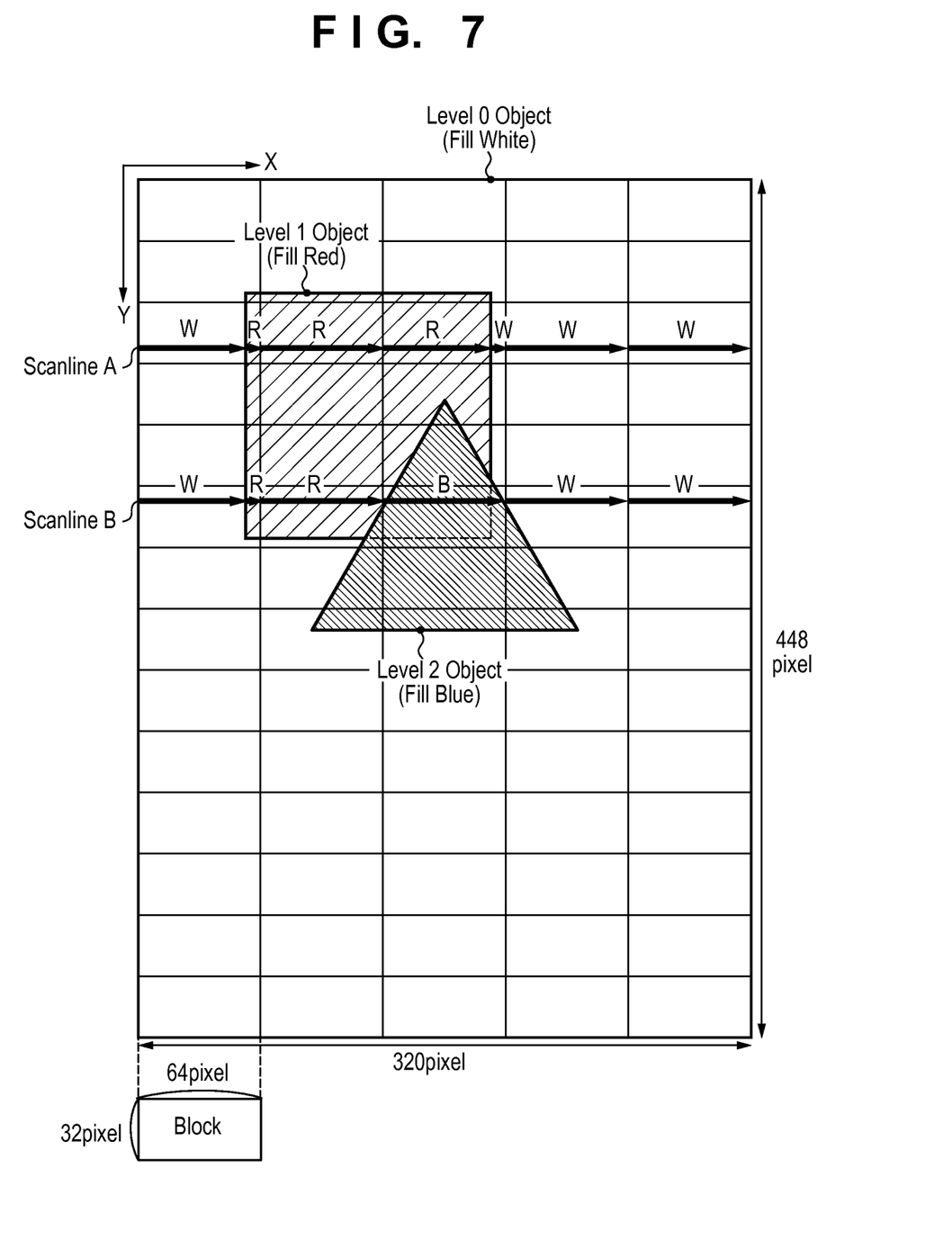
FIG. 7 is a view showing rendering processing executed in block units of another size.
Figure 8:
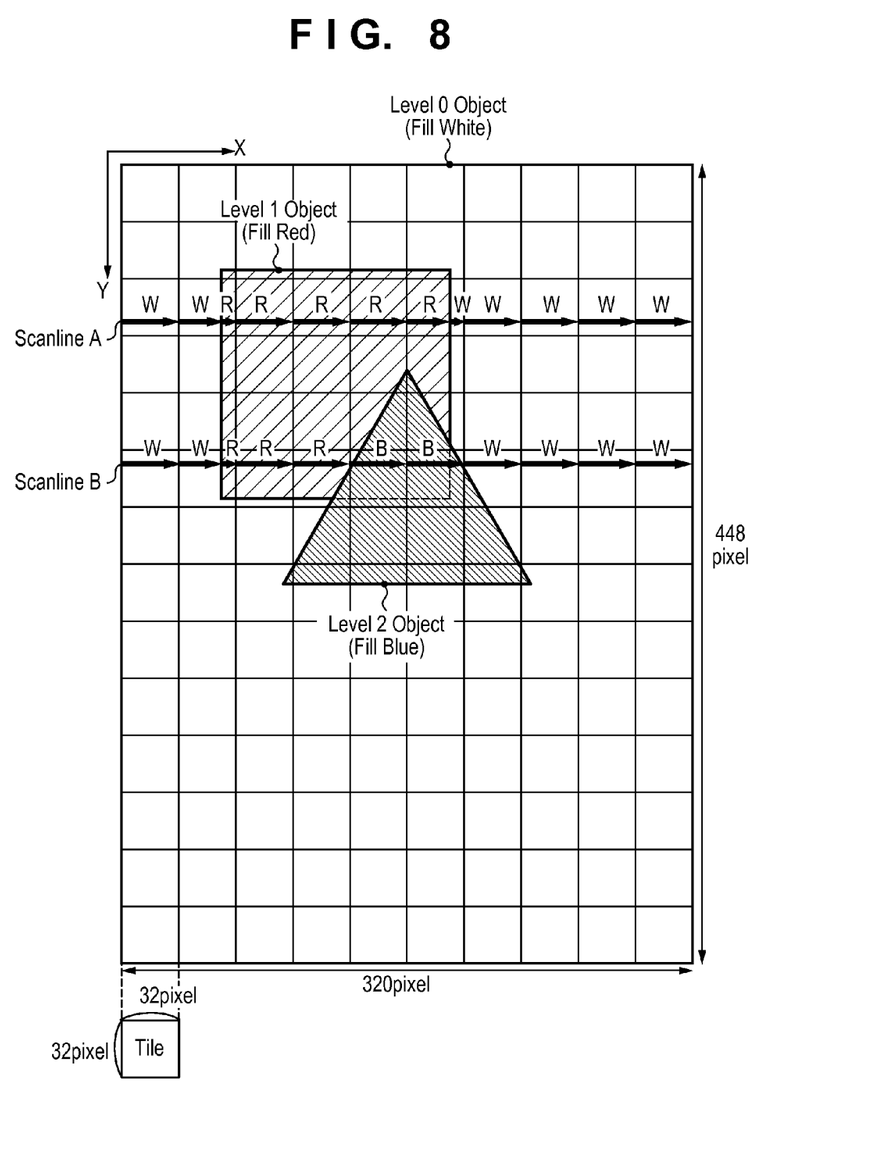
FIG. 8 is a view showing rendering processing executed in tile units.

Image data in block units will be described below with reference to FIGS. 5 to 9. FIGS. 5 to 8 show an example in which a single page having 320 pixels in a main scanning (X-axis) direction and 448 pixels in a sub-scanning (Y-axis) direction is divided into image data in block units having different sizes. FIG. 5 shows an example of band units (320 pixels×32 pixels) obtained by dividing the single page into bands each having a predetermined band height (32 pixels). FIG. 6 shows an example of block units (160 pixels×32 pixels) obtained by dividing the single page into blocks each having a predetermined block width (160 pixels) and block height (32 pixels). FIG. 7 shows an example of block units (64 pixels×32 pixels) obtained by dividing the single page into blocks each having a predetermined block width (64 pixels) and block height (32 pixels), which are different from FIG. 6. FIG. 8 shows an example of tile units (32 pixels×32 pixels) obtained by dividing the single page into tiles each having a predetermined tile width and height (32 pixels).

Figure 9:
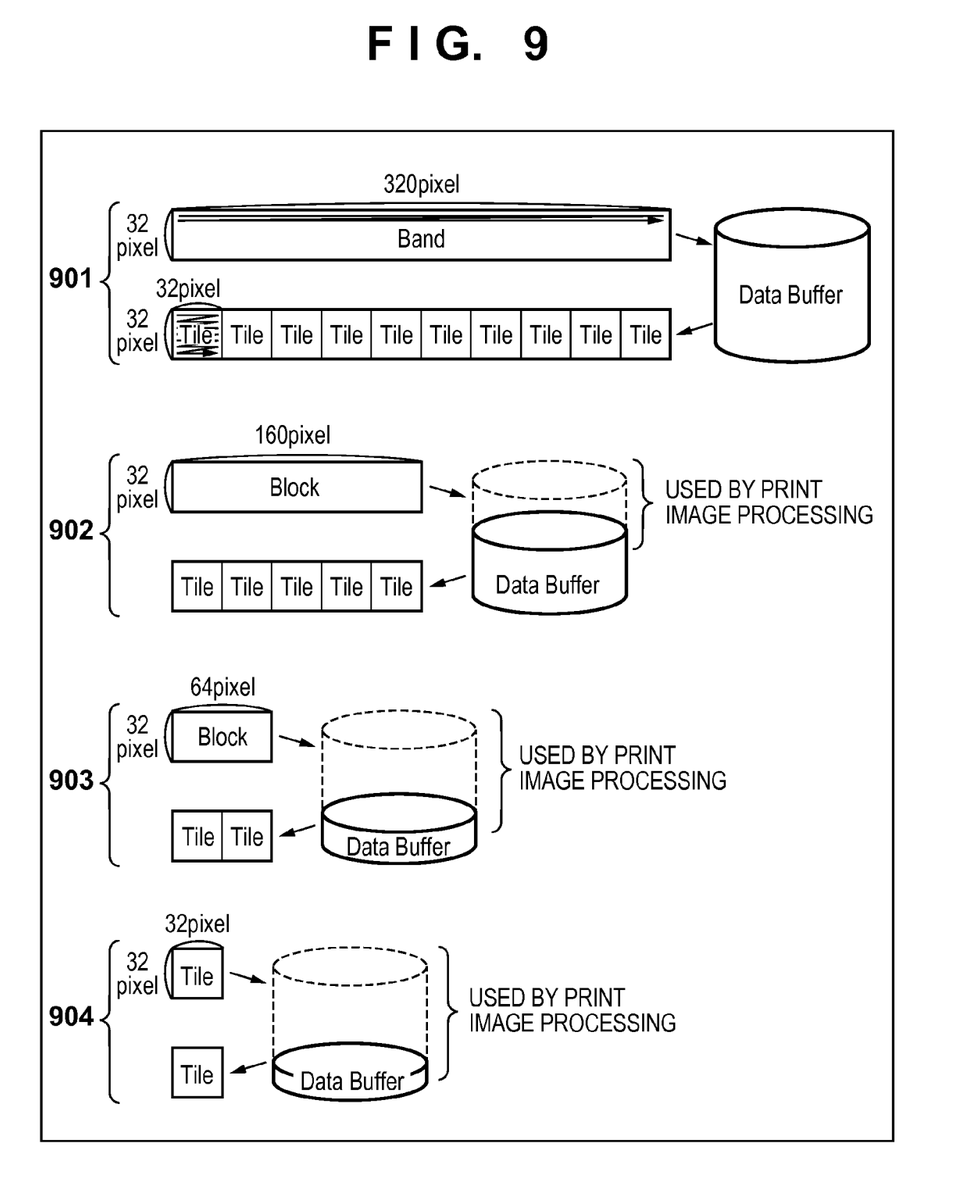
FIG. 9 is a view showing tile division processing.

FIG. 9 is a view for comparing the storage capacities of the local RAM a 1007 used to temporarily store image data in block units generated by the renderer 1000, and reference numerals 901, 902, 903, and 904 respectively correspond to FIGS. 5, 6, 7, and 8. A DL corresponding to pages of each of FIGS. 5 to 8 holds a depth relationship (Z axis) of rendering objects as overlapping information including a white background as a Level 0 object, a red rectangle as a Level 1 object, and a blue triangle as a Level 2 object.

Using the DL as input data, the renderer 1000 detects intersection coordinates with edges of the rendering objects for respective scan lines in the main scanning (X-axis) direction, and executes edge-to-edge fill processing. Note that, for example, the number of rendering commands (Fill White/Red/Blue) indicated by arrows on scan lines A and B indicates the number of times of fill processing of the scan lines A and B by the renderer 1000, and serves as a feature amount used to decide a rendering processing time. As can be seen from comparison of FIGS. 5 to 8 while focusing attention on the numbers of arrows, the number of arrows on the scan lines A and B, which are divided at boundaries of block units, increases in the order of FIG. 5→FIG. 6→FIG. 7→FIG. 8. In this manner, the processing time of the renderer 1000 becomes shorter as each block unit is larger, and becomes longer as each block unit is smaller.

However, as can be seen from comparison of the storage capacities of the local RAM a 1007, which temporarily stores image data in block units generated by the renderer 1000, as shown in FIG. 9, the storage capacity is reduced in the order of 901→902→903→904. In this manner, the storage capacity of the local RAM a 1007 used to temporarily store image data in block units generated by the renderer 1000 becomes larger as each block unit is larger, and becomes smaller as each block unit is smaller. When the storage capacity of the local RAM a 1007 is reduced, allocations of the primary storage areas available in the controller 100 can be changed to increase the storage capacities of the local RAM b 1008 to local RAM d 1010. Since these local RAM b 1008 to local RAM d 1010 are primary storage areas used by the processing units used to execute a series of image processes associated with image quality of print image data, image quality can be improved by increasing their storage capacities.

Figure 10:
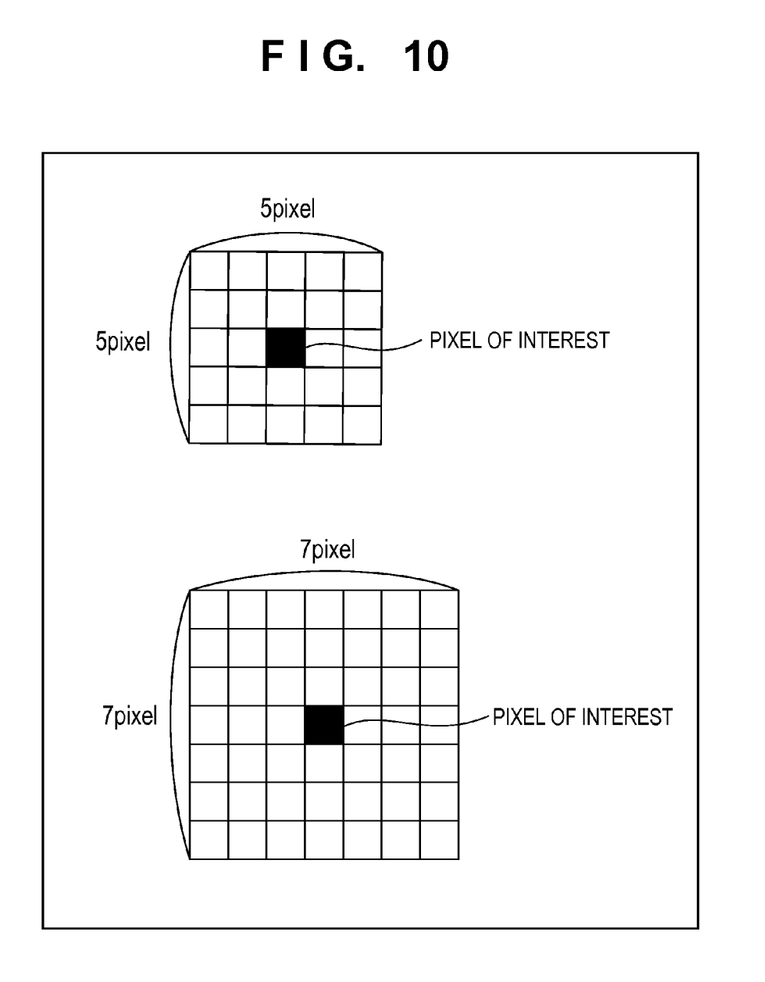
FIG. 10 is a view showing an example of print image processing (filter processing)

Many examples in which image quality is improved by increasing the storage capacities are known. As one example, a case will be described below wherein filter processing for changing a value of a pixel of interest by referring to values of peripheral pixels of the pixel of interest is executed, as shown in FIG. 10. In general, use of a window of 7×7 pixels, which requires a larger primary storage area than that of 5×5 pixels as peripheral pixels to be referred to in the filter processing, can improve macroscopic image quality of print image data.

Thus, with respect to the primary storage areas of the image processors which can improve image quality by increasing their primary storage areas, the capacity control unit 1006 changes allocations of the primary storage areas of the local RAM a 1007 to local RAM d 1010. In this way, when the storage capacity of the local RAM a 1007 is decreased, since those of the local RAM b 1008 to local RAM d 1010 can be increased, image quality can be improved while suppressing PDL print speed performance. In other words, when the storage capacity of the local RAM a 1007 is increased, the storage capacities of the local RAMs b 1008 to d 1010 are decreased. The speed performance can be improved while suppressing the PDL print image quality. As described above, by changing the size of a block unit upon rendering output processing is changed according to the allocated storage capacities of the local RAMs, scalabilities of the PDL print speed performance and image quality can be provided.

<Processing Sequence>

Figure 3:
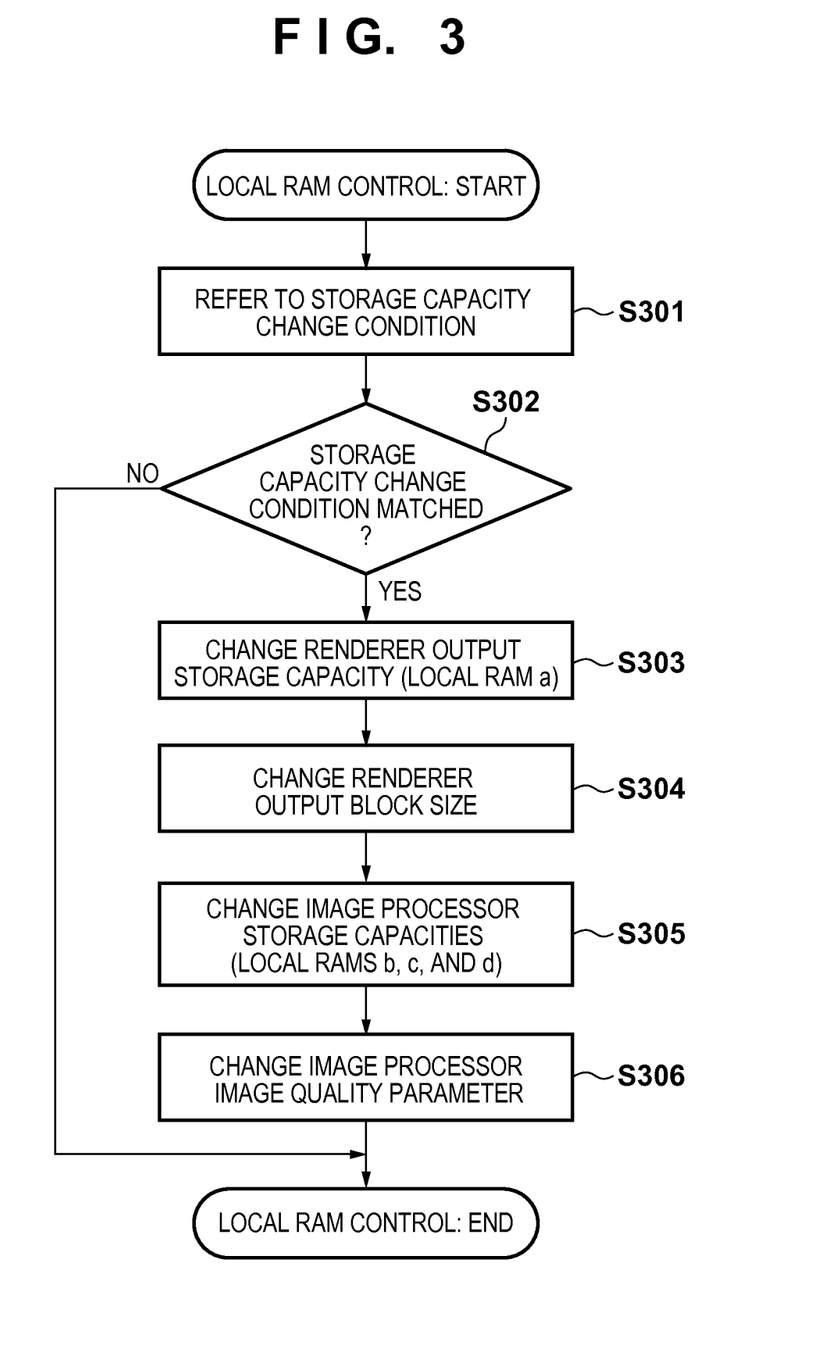
FIG. 3 is a flowchart for explaining local RAM control processing.
Figure 4:
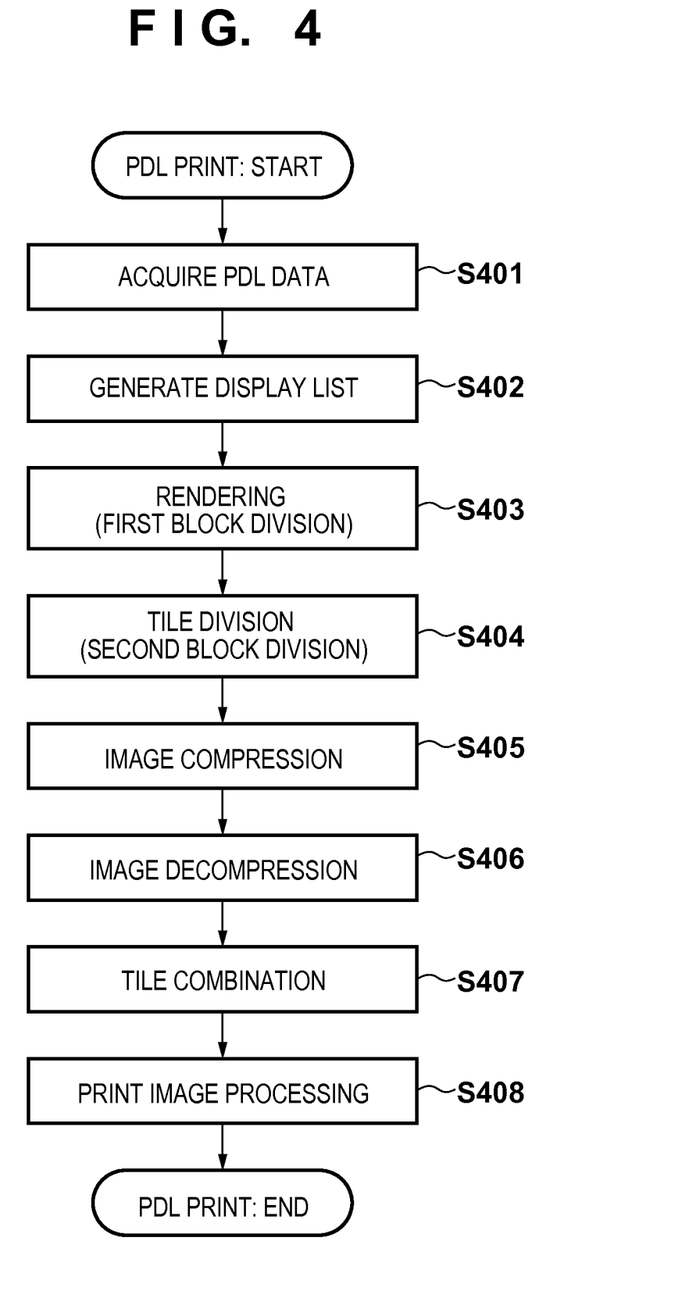
FIG. 4 is a flowchart for explaining PDL print processing.

The processing sequences of the PDL print processing according to the present invention and local RAM control related to the PDL print processing will be described below with reference to the flowcharts shown in FIGS. 3 and 4. Processes to be described below are implemented when the CPU 101 reads out a control program stored in the ROM 102, HDD 104, or the like to the RAM 103, and executes the readout program. Note that the order of processes to be described below is an example, and does not intend to limit the present invention.

The processing sequence of the PDL print processing will be described first with reference to FIG. 4. In step S401, the CPU 101 acquires PDL data transferred from a host computer or server onto the network 300 into the image processing apparatus via the network I/F 106, and stores the PDL data in the RAM 103. Next, in step S402, the CPU 101 interprets the PDL data stored in the RAM 103 to convert it into a DL, and stores this DL in the RAM 103 again.

Next, the CPU 101 activates the RIP processor 109. In step S403, the RIP processor 109 executes rendering processing including first block division by the renderer 1000 using the DL stored in the RAM 103 as input data, and temporarily stores image data in block units in the local RAM a 1007. In step S404, the RIP processor 109 executes tile division processing as second block division using the image data in block units temporarily stored in the local RAM a 1007 as input data, and temporarily stores image data in tile units in the local RAM b 1008. Next, in step S405, the RIP processor 109 executes image compression processing such as JPEG using the image data in tile units temporarily stored in the local RAM b 1008 as input data. In this case, the RIP processor 109 stores the obtained tile compressed image data in the RAM 103 again, and then notifies the CPU 101 of an end interruption of the rendering processing.

Next, the CPU 101 activates the print image processor 111. In step S406, the print image processor 111 executes image decompression processing by the image decompression unit 1003 using the tile compressed image data stored in the RAM 103 as input data, and temporarily stores image data in tile units in the local RAM c 1009. In step S407, the print image processor 111 executes tile combining processing by the tile combining unit 1004 using the image data in tile units temporarily stored in the local RAM c 1009, and temporarily stores image data in band units in the local RAM d 1010. Next, in step S408, the print image processor 111 executes color space conversion and halftone processing by the CSC/HT 1005 using the image data in band units temporarily stored in the local RAM d 1010 as input data. In this case, the print image processor 111 transfers the obtained print image data to the printer engine 500, and then notifies the CPU 101 of an end interruption of the print image processing.

Figure 11:
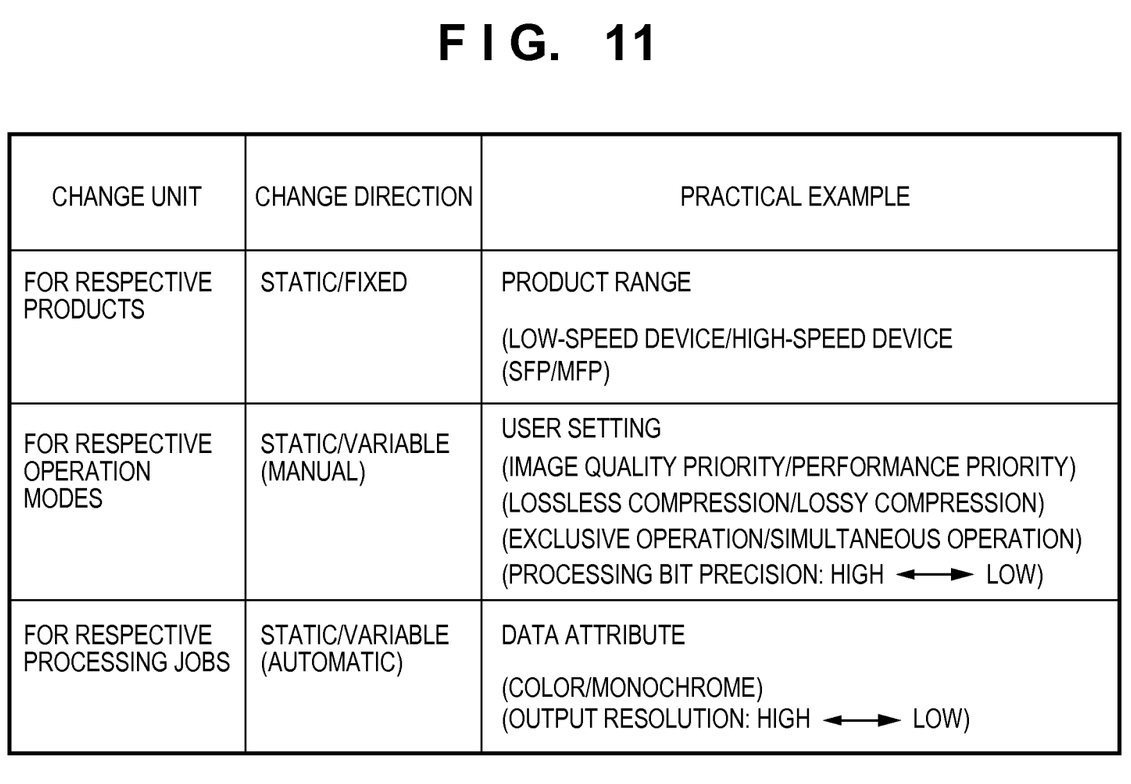
FIG. 11 is a table showing change units and change methods of storage capacities of local RAMs.

The processing sequence of the local RAM control will be described below with reference to FIG. 3. In step S301, the CPU 101 refers to a storage capacity change condition of the local RAM a 1007 to local RAM d 1010. The condition to be referred to by the CPU 101 in step S301 will be described below with reference to FIG. 11. As shown in FIG. 11, a storage capacity change unit for, for example, respective products (model information), that for respective operation modes, or that for respective processing jobs (job types) is applicable. When the change unit for respective products is applied, the CPU 101 acquires an input value obtained from an external pin or the like in correspondence with a product range such as a high/low-speed device, MFP, or SFP on the controller 100. In case of the change unit for respective products, a static change method is adopted, and is fixed for each product. When the change unit for respective operation modes is applied, the CPU 101 acquires setting information such as an image quality priority mode or performance priority mode from a user operation at the operation unit 200 via the operation unit I/F 105. In case of the change unit for respective operation modes, a static change method is adopted, and when the operation mode is manually changed, the storage capacities are changed accordingly. When the change unit for respective processing jobs is applied, the CPU 101 acquires data attributes such as an output resolution and color or monochrome from PDL data acquired from the network 300 or scan image data acquired from the scanner engine 400. In case of the change unit for respective processing jobs, a dynamic change method is adopted, and the storage capacities are automatically changed for respective processing jobs.

Referring back to FIG. 3, the CPU 101 determines in step S302 based on the information acquired in step S301 whether or not the storage capacity change condition is matched. If the change condition is matched in step S302, the process advances to step S303; otherwise, the local RAM control ends. Note that the case in which the change condition is matched means an input value from the external pin or the like acquired on the controller 100 is different from an initial state of the system in case of the change unit for respective products. On the other hand, in case of the change unit for respective operation modes, that case means that setting information acquired from a user operation is different from a state before change. Also, in case of the change unit for respective processing jobs, that case means that data attributes such as an output resolution and color or monochrome are different upon comparison between those of the previously processed page and the next page to be processed.

If the CPU 101 determines that the storage capacities are required to be changed, it changes the storage capacity of the local RAM a 1007 in step S303. More specifically, the CPU 101 accesses a register of the capacity control unit 1006 in the local RAM controller 112 to change the storage capacity of the local RAM a 1007 used in the rendering output processing of the renderer 1000 according to the change condition matched in step S302. Furthermore, in step S304, the CPU 101 serves as a division control unit, and accesses a register of the renderer 1000 in the RIP processor 109 to change a size of the first block division executed in the rendering processing of the renderer 1000 in correspondence with the change in step S303. Note that the block division size to be changed is uniquely determined for the storage capacity of the local RAM a 1007 changed in step S303, as described above by associating FIGS. 5, 6, 7, and 8 with 901, 902, 903, and 904, respectively. Note that the storage capacity and block division size decided in steps S303 and S304 influence the storage capacities and image processing parameters to be decided in subsequent steps S305 and S306 to achieve a balance between the PDL speed performance and image quality. Therefore, for example, the image processing apparatus may decide required storage capacities and image processing parameters in subsequent steps S305 and S306 so as to obtain a predetermined image quality, and may decide the storage capacity and block division size in steps S303 and S304 by making back calculations from the storage capacities.

In step S305, the CPU 101 accesses a register of the capacity control unit 1006 in the local RAM controller 112 to change the storage capacities of the local RAM b 1008 to local RAM d 1010 used by the image processors after the tile division unit 1001. In step S306, the CPU 101 accesses registers of the image processors after the tile division unit 1001 in the RIP processor 109 and print image processor 111 to change image processing parameters associated with image quality in correspondence with the change in step S305, thus ending the processing. The processing of the CPU 101 in this case is an example of that of a division control unit.

Finally, image processing parameters related to the PDL print performance and image quality described in FIG. 11 will be described. In order to adjust a tradeoff between the PDL print speed performance and image quality in the image processing apparatus, image compression may be switched between lossless compression and lossy compression or a compression ratio of JPEG as lossy compression may be changed in addition to the aforementioned example. Also, as for copy and PDL print processing systems which make conflict operations, they may be switched between simultaneous operations and exclusive operations. Furthermore, for example, the bit precision upon execution of the image processing may be switched from 8 bits to 10 bits.

As described above, according to the embodiment of the present invention, by changing a division size of first block image data generated by rendering in accordance with a storage capacity allocated to a first storage unit in PDL print processing, the PDL print speed performance is adjusted. By executing the print image processing according to a storage capacity allocated to a second storage unit accordingly, PDL print image quality is adjusted. In this manner, by changing the division size of the first block image data in the rendering processing, a tradeoff between the PDL print speed performance and image quality is adjusted, thus providing a means for flexibly changing the speed performance and image quality to the user in the PDL print processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197899 filed on Sep. 7, 2012, which is hereby incorporated by reference herein in its entirety.

What is claimed is:

1. An image processing apparatus comprising:
a first division unit configured to divide image data input in a page unit into data in block units;
a first storage unit configured to store a plurality of block images divided by said first division unit;
a second division unit configured to read out each block image stored in said first storage unit and divide the block image into a plurality of tile images smaller than the block image;
a second storage unit configured to store the plurality of tile images divided by said second division unit;
a determination unit configured to determine, with reference to a parameter associated with said image processing apparatus, whether or not an allocation of a storage capacity to said first storage unit is required to be changed;
a capacity control unit configured to change, in a case where said determination unit has determined that the allocation of the storage capacity is required to be changed, the allocation of the storage capacity in correspondence with the parameter; and
a division control unit configured to change a division size in said first division unit in accordance with the storage capacity of said first storage unit allocated by said capacity control unit.

2. The apparatus according to claim 1, wherein said first storage unit and said second storage unit are divided as different storage areas in a single storage device.

3. The apparatus according to claim 1, wherein the parameter associated with said image processing apparatus is model information of said image processing apparatus.

4. The apparatus according to claim 3, wherein the model information includes at least one of information indicating a high-speed device or a low-speed device and information indicating an MFP or an SFP.

5. The apparatus according to claim 1, wherein the parameter associated with said image processing apparatus is an operation mode of said image processing apparatus.

6. The apparatus according to claim 5, wherein the operation mode includes at least one of information indicating a mode for prioritizing an image quality of an image to be output or a mode for prioritizing a speed of an image to be output, information indicating whether image compression to be used is lossless compression or lossy compression, information indicating a simultaneous operation mode of a plurality of processing systems or an exclusive operation mode of the processing systems, and information indicating bit precision of image processing.

7. The apparatus according to claim 1, wherein the parameter associated with said image processing apparatus is a job type of a job to be processed by said image processing apparatus.

8. The apparatus according to claim 7, wherein the job type includes at least one of information indicating color or monochrome and information indicating a resolution of an image to be output.

9. A control method of an image processing apparatus, which comprises a first division unit configured to divide image data input in a page unit into data in block units, a first storage unit configured to store a plurality of block images divided by the first division unit, a second division unit configured to read out each block image stored in the first storage unit and to divide the block image into a plurality of tile images smaller than the block image, and a second storage unit configured to store the plurality of tile images divided by the second division unit, the method comprising:
determining, with reference to a parameter associated with the image processing apparatus, whether or not an allocation of a storage capacity to the first storage unit is required to be changed;
changing, in a case where it has been determined in the determining whether or not the allocation of the storage capacity to the first storage unit is required to be changed, the allocation of the storage capacity in correspondence with the parameter; and
changing a division size in the first division unit in accordance with the storage capacity of the first storage unit allocated in the changing the allocation.

10. A non-transitory computer-readable storage medium storing a computer program for controlling a computer to execute respective steps in a control method of an image processing apparatus according to claim 9.

* * * * *